United States Patent [19]

Snyder et al.

[11] 4,441,533

[45] Apr. 10, 1984

[54] AUTOMATIC FUEL DISPENSER

[76] Inventors: George H. Snyder, Box 68-25, Rte. 2, Ozark, Mo. 65721; George H. Snyder, III, 2541 S. Collinson Ave., Springfield, Mo. 65804; Joseph M. Nusbaumer, 2769 Village Ter., Springfield, Mo. 65807

[21] Appl. No.: 203,228

[22] Filed: Nov. 3, 1980

Related U.S. Application Data

[63] Continuation-in-part of Ser. No. 966,387, Dec. 4, 1978, abandoned.

[51] Int. Cl.³ ............................................. B65B 31/00
[52] U.S. Cl. ..................................... 141/59; 141/225; 141/392; 220/86 R
[58] Field of Search ............ 141/59, 97, 198, 206–229, 141/285, 286, 290, 291, 292, 295, 301, 302, 305, 311 R, 346–348, 392; 220/86 R, 85 VR

[56] References Cited

U.S. PATENT DOCUMENTS 3,042,084  7/1962  Boone et al. ......................... 141/225
4,157,104  6/1979  Lofquist, Jr. ....................... 141/392 X Primary Examiner—Frederick R. Schmidt
Attorney, Agent, or Firm—Horace S. Harper

[57] ABSTRACT

An automatic fuel dispensing system including an automatic dispensing nozzle similar to dispensing nozzles which open manually to dispense liquids and shut-off automatically when tanks such as locomotive fuel tanks near the point of being filled, or for closing an automatic shut-off valve when the dispensing valve is a substantial distance from the tank being filled. The automatic dispensing system is provided with an atmospheric pressure balanced diaphragm and an internal vacuum conduit where the diaphragm operates the shut-off valve when reduced air pressure from the vacuum conduit interrupts the pressure balance of the diaphragm. The tank to be filled is provided with an air conduit connected to the internal vacuum conduit of the automatic dispensing nozzle to operate the cut-off of the nozzle to a point adjacent the outer opening of the tank fill pipe when fuel enters the air conduit. Mounted in the fill pipe of the tank is a fill pipe adapter which cooperates with the nozzle spout of the automatic dispensing nozzle to create a vacuum chamber between the inserted nozzle spout and the adapter wall. To satisfy the vacuum demand of the automatic shut-off valve, the nozzle spout extends into the fill pipe adapter a sufficient distance to provide a narrow opening between the end of the spout and the adapter wall such that when liquid is dispensed from the nozzle spout, air is removed from the vacuum chamber creating a partial vacuum for operating the shut-off valve.

5 Claims, 12 Drawing Figures

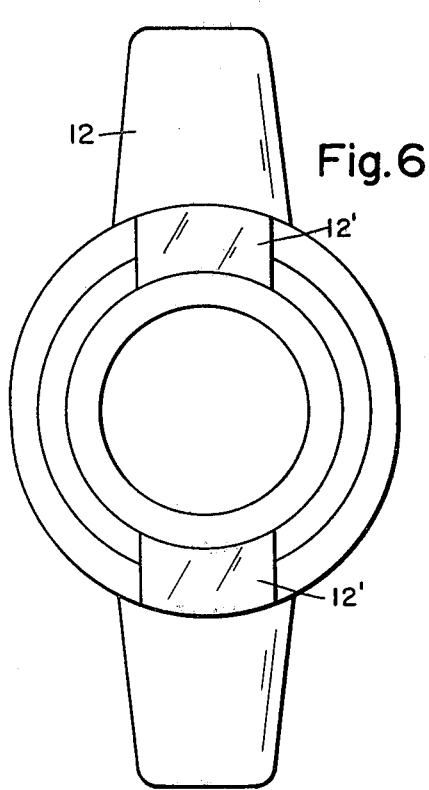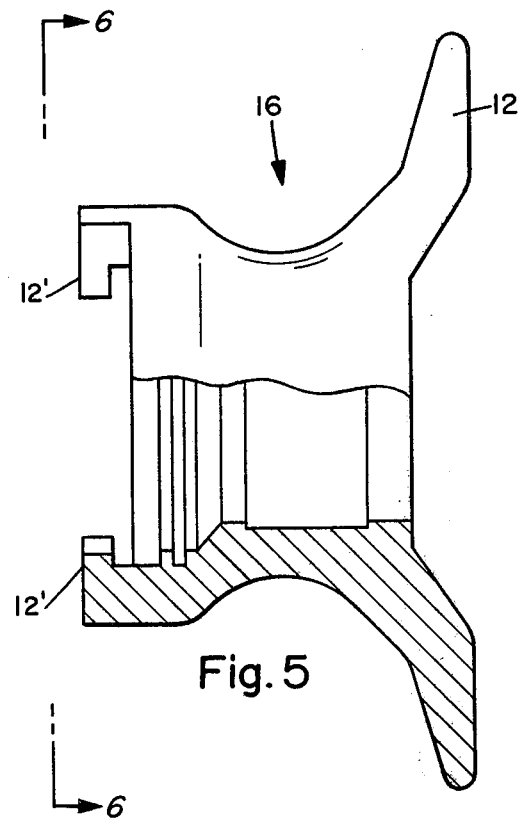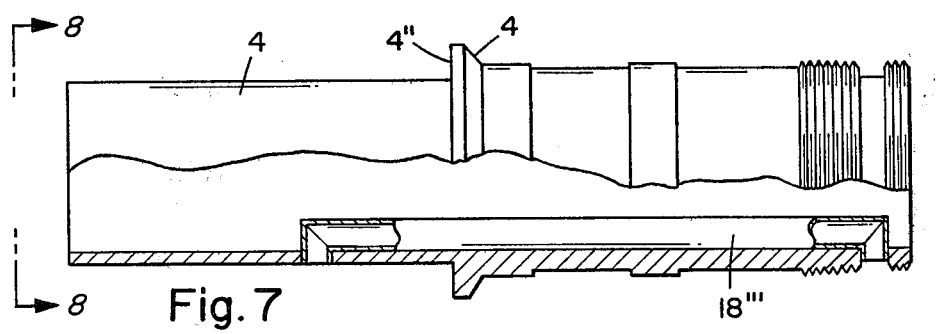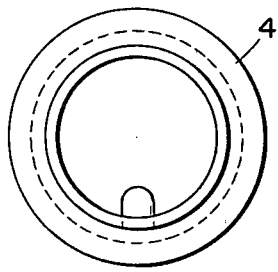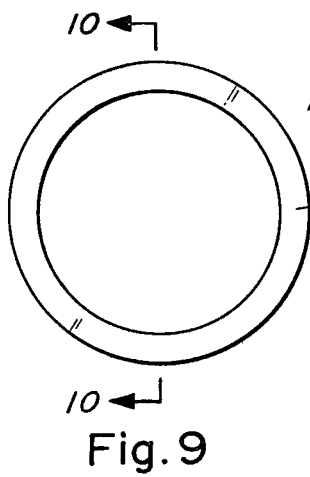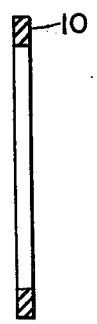

AUTOMATIC FUEL DISPENSER

FIELD OF THE INVENTION

This is a Continuation-In-Part of our earlier application, Ser. No. 966,387, filed Dec. 4, 1978, now abandoned.

The invention relates to an arrangement for operating an automatic cut-off nozzle for filling locomotive fuel tanks, but is not limited thereto and may be used with any type of liquid filling operation regardless of the composition and/or purpose of the fluid.

The invention relates particularly to an arrangement whereby the conduit used to balance the pressure on the nozzle diaphragm is connected to the fuel pipe and not to the nozzle per se.

The filling of these large tanks is usually carried out by using an automatic dispensing nozzle similar to the patent to Wallace D. Boone, et al U.S. Pat. No. 3,042,084, dated July 3, 1962, and it is with this type nozzle this improved arrangement for filling these large tanks is used. In the Boone patent there is a flexible conduit having one end connected to the nozzle and the opposite end connected with a conduit permanently fixed to the tank; therefore, it is necessary to connect the outlet end of the nozzle to the outer end of the fill pipe, and to also connect the air conduit carried by the tank to the air conduit carried by the nozzle which, when the tank is filled, requires that both the nozzle must be disconnected from the tank and the air conduit must be disconnected from the air conduit permanently carried by the tank. As has been said before, unless this air conduit is connected with the tank, the automatic cut-off feature will not operate.

Automatic dispensing nozzles similar to Boone, et al, include a lever actuated dispensing valve and a latch mechanism for holding the lever in a valve open position. There is a vacuum responsive valve and trip mechanism for unseating the latch to thereby shut off the dispensing valve when the fuel tank is full. The vacuum responsive valve has a flexible diaphragm which is mounted in a chamber and secured in place by a cap which is vented to the atmosphere. A compression spring urges the trip mechanism to a dispensing valve open position. The extended nozzle has a sensing conduit which extends from near the distal end to a passageway connected to the vacuum responsive valve chamber.

In operation the nozzle is inserted in a tank and the dispensing valve is opened to fill the tank. During the dispensing operation and while the level of the liquid in the tank is below the lower end of the sensing conduit, the vacuum responsive valve chamber is vented to the atmosphere. Therefore, once the latch mechanism has been latched in the open valve position, it will remain latched and the dispensing operation will continue. However, when the level of the liquid in the tank is sufficiently high to cover the sensing conduit at the distal end of the nozzle, communication between the chamber and the atmosphere is interrupted and the action of the fluid flowing past the passageway reduces the pressure in the chamber. When the pressure in the chamber is reduced by a sufficient amount to overcome the compression spring, the diaphragm moves to the trip mechanism which trips the latch mechanism to close the dispensing valve. The subject matter of Boone, et al, 3,042,084 is incorporated hereby by reference.

DESCRIPTION OF THE PRIOR ART

There are a number of patented automatic cut-off valves in the patent art, the most interesting being: Boone, et al, U.S. Pat. No. 3,042,084; Klikunuas, et al, U.S. Pat. No. 2,840,122; and Lofquist, U.S. Pat. No. 4,157,104.

In general, a cut-off valve operates by creating a partial vacuum within the nozzle which vacuum is applied to a diaphragm which, when flexed under the influence of the vacuum so applied, permits the nozzle to trip closed cutting off the flow of liquid to the locomotive tank when the liquid reaches the outer end of a vacuum relief tube.

In FIG. 2 of the Klikunuas patent there is illustrated a fuel tank of a locomotive to be filled by a fuel supply in which part of the vacuum containing mechanism is carried by the locomotive itself as a part of the fuel tank inlet filler pipe and into the tank for controlling the flow of the cut-off nozzle.

The disadvantage of this arrangement is that it requires different types or lengths of filler pipes for different types of locomotive tanks, and also it requires a different fixture for filling the locomotive fuel tank when using a nozzle without the automatic cut-off valve.

The Lofquist patent discloses a fuel dispensing apparatus, including an automatic dispensing nozzle and a fuel tank fill tube adaptor. There is an air conduit from the fuel tank to the adaptor and vapor vent holes in the adaptor for removing and recovering vapors. The dispensing nozzle includes a vapor conduit which opens to the adaptor and a venturi vent passageway to connect to the air conduit in the fuel tank. A spring biased seal on the nozzle covers the venturi vent passageway when the nozzle is not coupled to the fill tube adaptor. There are, in fact, several fluid tight seals on the nozzle to prevent vapor leaks.

There are significant differences between the Lofquist apparatus and the present dispensing system. In Lofquist, for example, the tapered section of the adaptor prefects the seal with the spring biased seal and a seal ring on the forward end of the nozzle forms a vacuum chamber. The flow of liquid from the nozzle end will not draw air from the vacuum chamber; as a consequence, the Lofquist adaptor and/or dispensing nozzle are not compatible with the applicant's dispensing system.

Automatic fuel cut-off valves are very important mechanisms where large supplies of fuel are being transferred from one supply source to another, such as the filling of locomotive fuel tanks. It is also important that the connection connecting the couplings be of a single connection and that it be simple in construction and practical in its operation, and further, that the device be equally as usable when filling the tank with a nozzle other than an automatic cut-off nozzle.

SUMMARY OF THE INVENTION

An improvement of the present invention as compared with the above is that the air conduit from the tank is permanently connected to the outer end of the fixed fill pipe adjacent the means for coupling the nozzle to the fill pipe wherein it is only necessary to make the nozzle connection as the air hose connection is permanently located adjacent the outer end of the fill pipe.

The primary object of the invention is to provide a system or arrangement that will require only the connection of the nozzle to the outer end of the fill pipe.

Another object of the invention is to provide means for conveying air from the air inlet conduit from the tank to the automatic cut-off nozzle.

A further object of the invention is to provide a vacuum chamber about the outer end of the fill pipe.

Still a further object of the invention is to connect the vacuum chamber with the air conduit leading from the tank.

In the illustrations and description the present arrangement is presented in its simplest form; however, the principles set forth may be applied to such an arrangement or apparatus, regardless of the size and the use to which it is put.

These and other objects and advantages will become subsequently apparent as the nature of the invention is more fully disclosed, reference being had to the accompanying drawings forming a part thereof wherein like numerals refer to like parts throughout the several views.

BRIEF DESCRIPTION OF THE DRAWINGS

FIG. 5 is a view of a quick connecting element for connecting the nozzle assembly at the outer end of the fill pipe.

FIG. 6 is a view taken along line 6—6 of FIG. 5.

FIG. 7 is a view partly in elevation, partly in section, showing a modified end of the nozzle or nozzle extension adapted to extend into the fill pipe.

FIG. 8 is a view taken along line 8—8 of FIG. 7.

FIG. 9 is a view in elevation of the seal between the nozzle and the fill pipe.

FIG. 10 is a sectional view taken on the line 10—10 of FIG. 9.

DESCRIPTION OF THE INVENTION

Figure 1:
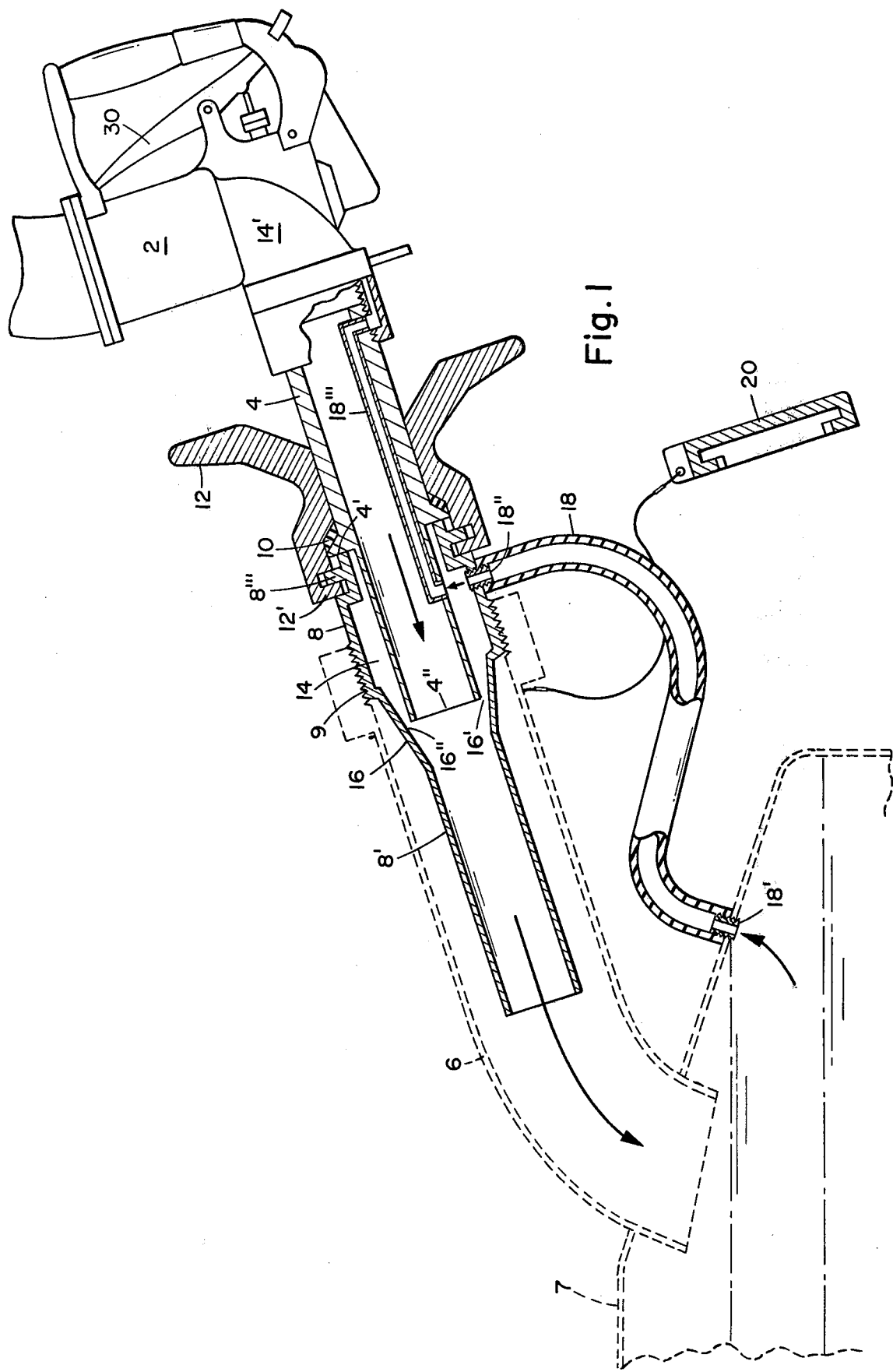
FIG. 1 is a sectional view showing the manner in which the nozzle assembly fits into the fill pipe of a locomotive tank.

Referring now to the drawings in detail, FIG. 1 shows the general principle on which the invention is based. An automatic dispensing nozzle 2, such as is shown in the Boone, et al, patent, having an internal venturi (not shown), where a vacuum is created during dispensing, and an automatic shut-off mechanism (not shown), including a pressure balanced diaphragm, which operates an operating lever 30. The nozzle 2 is provided with an extended nozzle 4 of such size and length as to extend inwardly beyond the outer end of a conventional fill pipe 6 fixed to a tank 7. The fill pipe 6 is welded or bonded to the tank 7 in such a manner to form an air tight seal between the fill pipe 7 and the tank, this is of course conventional, and therefore, forms no part of the present invention. The fill pipe 6 is provided with an enlarged cylindrical end having internal screw threads 9 on which a fill pipe adaptor 8 of this invention is threaded. The fill pipe adaptor 8 is clearly shown in FIGS. 1, 2 and 3.

The extended nozzle is provided with an outer ring-like shoulder 4' which cooperates with a compressing seal 10 and locking element 12 to form a locked on sealed connection with the end of the fill pipe adaptor 8 to prevent leaking of the liquid material between the nozzle and the fill pipe adaptor. There is an outer ring 8''' on the end of the fill pipe adaptor 8 which mates with the L-shaped elements 12' (FIGS. 5 & 6) of the locking element 12 for quick connection and disconnection of the automatic dispensing nozzle 2. The fill pipe adaptor is provided with a vacuum area or vacuum chamber 14 which is formed between the exterior wall of the extended nozzle 4 and the interior wall of the enlarged cylindrical end containing threaded section 9 and a frusto conical shaped portion 16. The extended nozzle 4 is of such a length to extend beyond the enlarged cylindrical end into the frusto conical shaped portion 16 of the fill pipe adaptor 8 where the vacuum area is reduced to a diameter at the smaller end of the frusto conical shaped portion 16 to a size no greater than the diameter of the extended nozzle 4. There is a cone-shaped space 16'' between the outer end 4'' of the extended nozzle and the outer end 16' of the wall of frusto conical shaped portion 16. The cone shaped space 16'' is very narrow as seen in FIG. 1, therefore, according to Bernoulli's theorem, the velocity of the liquid leaving the outer end 4'' of the extended nozzle 4 will cause a partial vacuum to be created within the vacuum area or chamber 14 to prevent the automatic dispensing nozzle shut-off valve from operating as long as air is available to the vacuum area chamber 14 through the air conduit 18 which will be more specifically referred to hereinafter. The smaller end of the frusto conical portion 16 has a reduced portion 8' of a diameter of extended nozzle 4, wherein the partial vacuum created between the extended nozzle 4 and the reduced portion 8' will more efficiently control the automatic dispensing nozzle shut-off valve because there is no cross sectional diameter change between the diameter of the extended nozzle 4 and the reduced portion 8' of the adaptor 8, therefore, the liquid flow is not effected by a reduced portion 8' of a smaller cross sectional diameter than the nozzle 8 or by a reduced portion 8' of a larger cross sectional diameter than the nozzle 8. In either situation, the pulling force of the liquid would be reduced and as a result the partial vacuum created would have less of an effect on the automatic dispensing nozzle 14'. The relationship between the smaller end of the frusto conical portion 16, the reduced portion 8' of a diameter of the extended nozzle 4, and the extended nozzle are important to the rapid filling of fuel tanks using the adaptor 8 of the present invention. As stated above, the automatic dispensing nozzle 14' shut-off valve is open as long as air is admitted to the vacuum area or chamber 14 from the tank. However, as soon as the liquid in the tank reaches the end 18' of the air conduit 18, atmospheric pressure will no longer balance the diaphragm in the automatic cut-off nozzle which will act to operate to close the valve admitting liquid to the tank.

In operation, the Boone, et al type automatic dispensing nozzle is connected with the outer ring 8''' of the fill pipe adaptor 8 by hooking the L-shaped elements of locking element 12 under the outer ring 8''' using a twisting motion. After the extended nozzle is connected to the fill pipe adaptor 8 the lever 30 is operated to admit liquid to the tank. The liquid will continue to flow until the liquid in the tank reaches the end 18' of the air conduit which will cut-off the air supply to the chamber 14' through interior tube 18''' of element 4 to element 14' causing the diaphragm to become unbalanced by cutting off the air to one side of the diaphragm causing it to move to trip the valve to cut off the flow of the liquid.

It is plain to see that by having the air conduit attached between the end of the tank and the outer end of the fill pipe adaptor 8, which remains attached to the fill pipe 6 at all times, it is not necessary to connect the air conduit to the nozzle itself or to the nozzle extension.

Connecting the air conduit beyond the coupling between the tank and the nozzle provides a very desirable arrangement. Heretofore, connecting the air conduit to the nozzle led to damage to the nozzle assembly if the operator forgot to disconnect the air conduit.

In the aforementioned patent to Boone, et al, U.S. Pat. No. 3,042,084, a spout is shown in which the sensing conduit is carried within the spout; however, there is no means for compressing the spout to the tank, which is mandatory for a high capacity transfer of liquids from one source to another.

The present arrangement for transferring liquids from one container to another greatly reduces human error, with only one simple connection to make, whereas in the past it was necessary to make an air connection at the nozzle.

Figure 2:
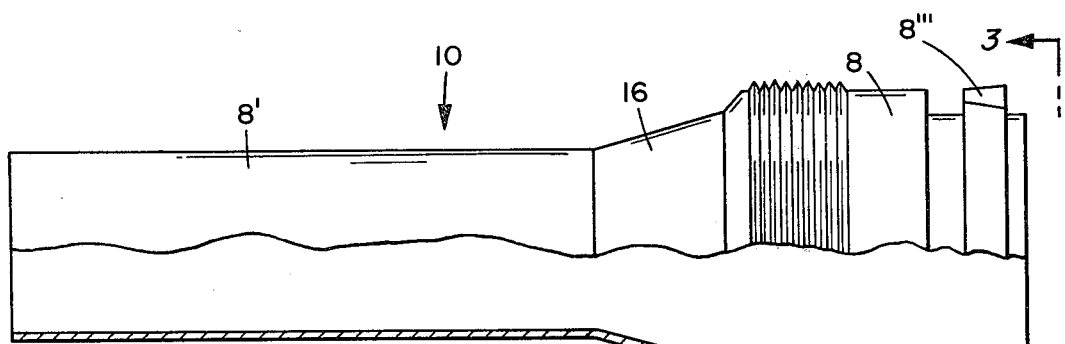
FIG. 2 is a view partly in elevation and partly in section of an adaptor for insertion into the outer end of a tank fill pipe.
Figure 3:
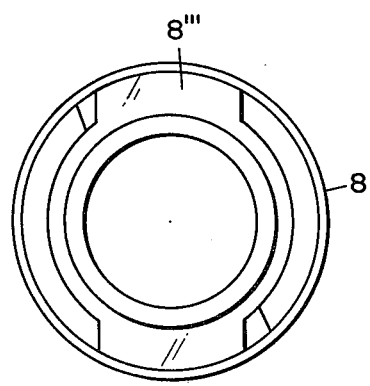
FIG. 3 is a view along the line 3—3 of FIG. 2.
Figure 4:
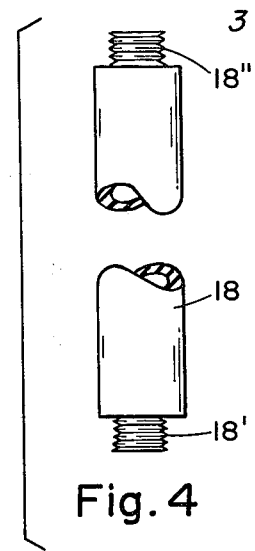
FIG. 4 is a fragmentary view of a hose assembly.
Figure 11:
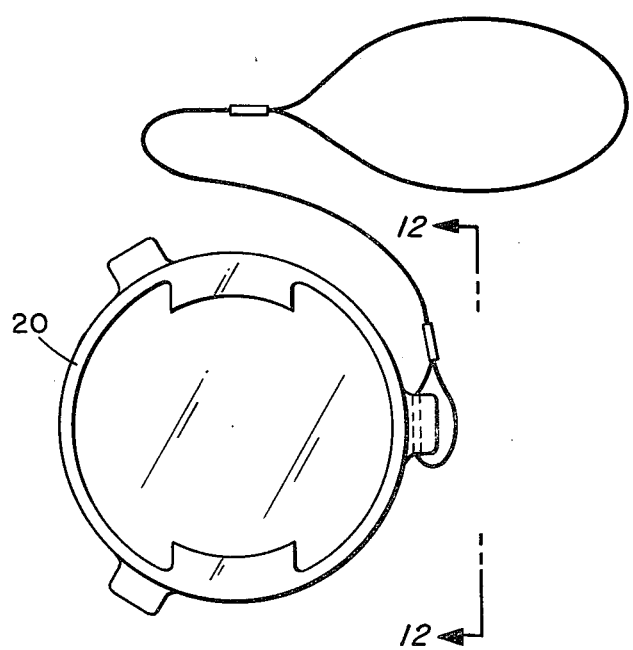
FIG. 11 is a view in elevation of a cover for the outer end of the fill pipe.
Figure 12:
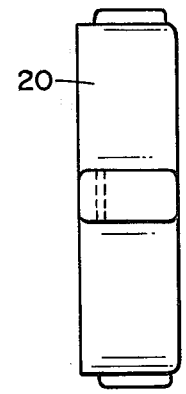
FIG. 12 is a side view of the cover taken on the line 12—12 of FIG. 11.

The simplicity and strength of the individual components of the assembly of this invention are further indicated in the individual detail Figures generally FIGS. 2 and 3 showing the fill pipe adaptor 8, FIG. 4 shows the vacuum lead 18, FIGS. 5 and 6 the locking element 12, FIGS. 7 and 8 show the nozzle extension 4, FIGS. 9 and 10 show the elastic gasket 10, and FIGS. 11 and 12 show the cover 20 for sealing the filler pipe adaptor 8 and the filler pipe 6 when the tank is not being filled.

The foregoing is considered as illustrative only of the principles of the invention. Further, since numerous modifications and changes will readily occur to those skilled in the art, it is not desired to limit the invention to the exact construction and operation described, and accordingly all suitable modification and equivalents may be resorted to falling into the scope of the invention.

I claim:

1. An improved filling system for moving a supply of liquid through an automatic nozzle for dispensing a liquid into a container including valve means, means including an operating lever for opening said valve means, pivotally mounted latch means, vacuum responsive means including a reciprocable member, trip means including a pivotally mounted lever connected to said reciprocable member and pivotally mounted concentrically with said latch means for engaging said latch means upon movement of said vacuum responsive means, means for biasing said latch means into automatic latching engagement with said operating lever upon actuation thereof to an open position, and means including conduit means for creating and supplying a vacuum to said vacuum responsive means for actuating said reciprocable member to trip and release said valve means when the liquid in said container reaches a preselected level, a fill pipe connected to said container, and a hollow adaptor for receiving the nozzle, the improvement comprising:

a nozzle apout having separate liquid dispensing and air removal passages, said air removal passage being connected at one end to said vacuum responsive means, said fill pipe adaptor having first end and a second end, said first end being attached to said filler pipe and said second end extending into said filler pipe, said second end having a reduced diameter, and a frusto-conical section between said first end and said second end, an air conduit connected to said first end of said fill pipe adaptor and to the interior of said container to remove air from said container to the interior of said fill pipe adaptor, a vacuum chamber between said nozzle spout and said fill pipe adaptor when said nozzle spout is inserted in said fill pipe adaptor, the length of said nozzle spout being of a length to extend into said frusto-conical section and to provide a narrow space between the end of the nozzle spout and the wall of the frusto-conical section, whereby the velocity of the liquid flowing out of the nozzle spout draws air through said narrow space between the end of said nozzle spout and the wall of said frusto-concial section to create a partial vacuum in said vacuum chamber to supply vacuum to said vacuum responsive means close said valve means.

2. An improved filling system as in claim 1 wherein said second end of said fill pipe adaptor has a diameter at or about the diameter of said nozzle spout.

3. An improved filling system as in claim 2 wherein said fill pipe adaptor and said nozzle spout includes mating coupling means, the coupling means on said nozzle spout being positioned inwardly from the dispensing end of said spout for engaging the companion coupling means on said filling pipe adaptor, where the distance said nozzle spout extends into said fill pipe adaptor is controlled by the positioning of said coupling means on said nozzle spout.

4. Adaptor means as defined in claim 3, wherein the spout coupling means includes an outer compressing ring.

5. An improved means according to claim 1 wherein said air conduit is a separate conduit.

* * * * *